June 2, 1953

O. ZAUNER 2,640,210

EGG WASHING MACHINE

Filed Aug. 9, 1949

INVENTOR.
Otto Zauner,
BY Victor J. Evans & Co.
ATTORNEYS

June 2, 1953  O. ZAUNER  2,640,210
EGG WASHING MACHINE
Filed Aug. 9, 1949  4 Sheets—Sheet 4

INVENTOR.
Otto Zauner,
BY Victor J. Evans & Co.
ATTORNEYS

Patented June 2, 1953

2,640,210

UNITED STATES PATENT OFFICE 2,640,210

EGG WASHING MACHINE

Otto Zauner, Vineland, N. J.

Application August 9, 1949, Serial No. 109,248

9 Claims. (Cl. 15—3.13)

This invention relates to egg cleaning devices or machines for cleaning eggs in quantities, and in particular a machine having a continuous trough around which eggs are rolled and in which the eggs are washed by spraying and cleaned by a high speed roller having a soft pliable surface over which the eggs are rolled both laterally and longitudinally and which also partially dries the egg.

The purpose of this invention is to provide an egg cleaning machine in which the surfaces of the egg are thoroughly soaked with warm water and in which both the side and ends are wiped with soft pliable material.

In the usual process of cleaning eggs it has been found difficult to thoroughly clean both the sides and ends without immersing the eggs in water and it is thought that eggs immersed in water do not keep as long as eggs cleaned by other means. With this thought in mind this invention contemplates an egg washer in which eggs are sprayed with warm water as they are rolled sidewise and endwise over a fast rotating roller with a soft pliable outer surface, and in the final stage the water is cut off and a section of the fast rotating roller removes a substantial part of the water whereby the eggs are substantially dry when delivered from the machine.

The object of this invention is, therefore, to provide means for constructing an egg washing machine wherein the eggs are washed by spraying and wherein the water is substantially removed from the eggs as they are delivered from the machine.

Another object of the invention is to provide an egg washing machine in which the eggs are rolled over a fast rotating roller with a soft surface wherein the eggs are rolled both sidewise and endwise over the roller.

A further object of the invention is to provide an improved egg washing machine that washes the eggs by spraying and removes a substantial part of the water from the eggs, which is of a comparatively simple and economical construction.

With these and other objects and advantages in view the invention embodies a horizontally disposed continuous shallow trough having conveying means therein and a high speed roller with a soft pliable surface and a smaller roller coacting therewith positioned in the lower surface of the trough and whereby the eggs are rolled longitudinally along the rollers by the conveying means.

Other features and advantages of the invention will appear from the following description taken in connection with the drawings wherein.

Figure 1:
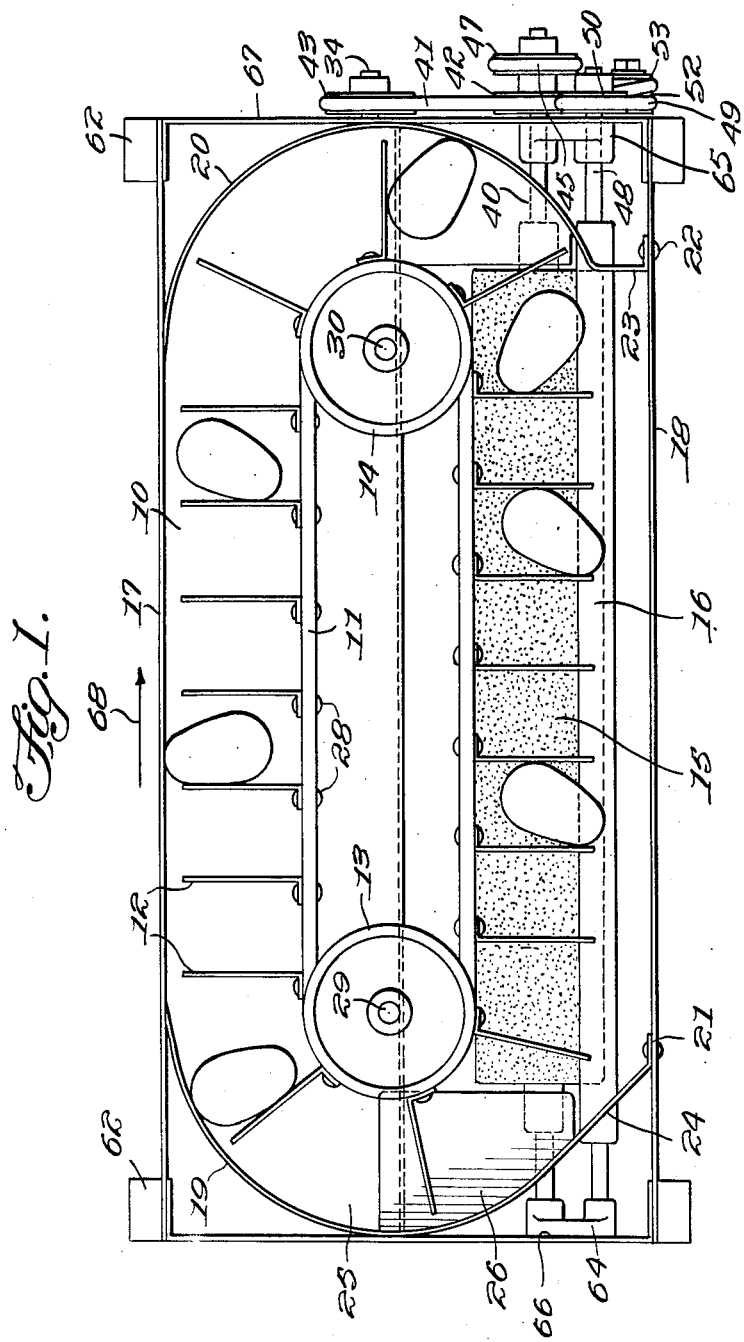
Figure 1 is a plan view of the egg washing machine with the cover removed.
Figure 2:
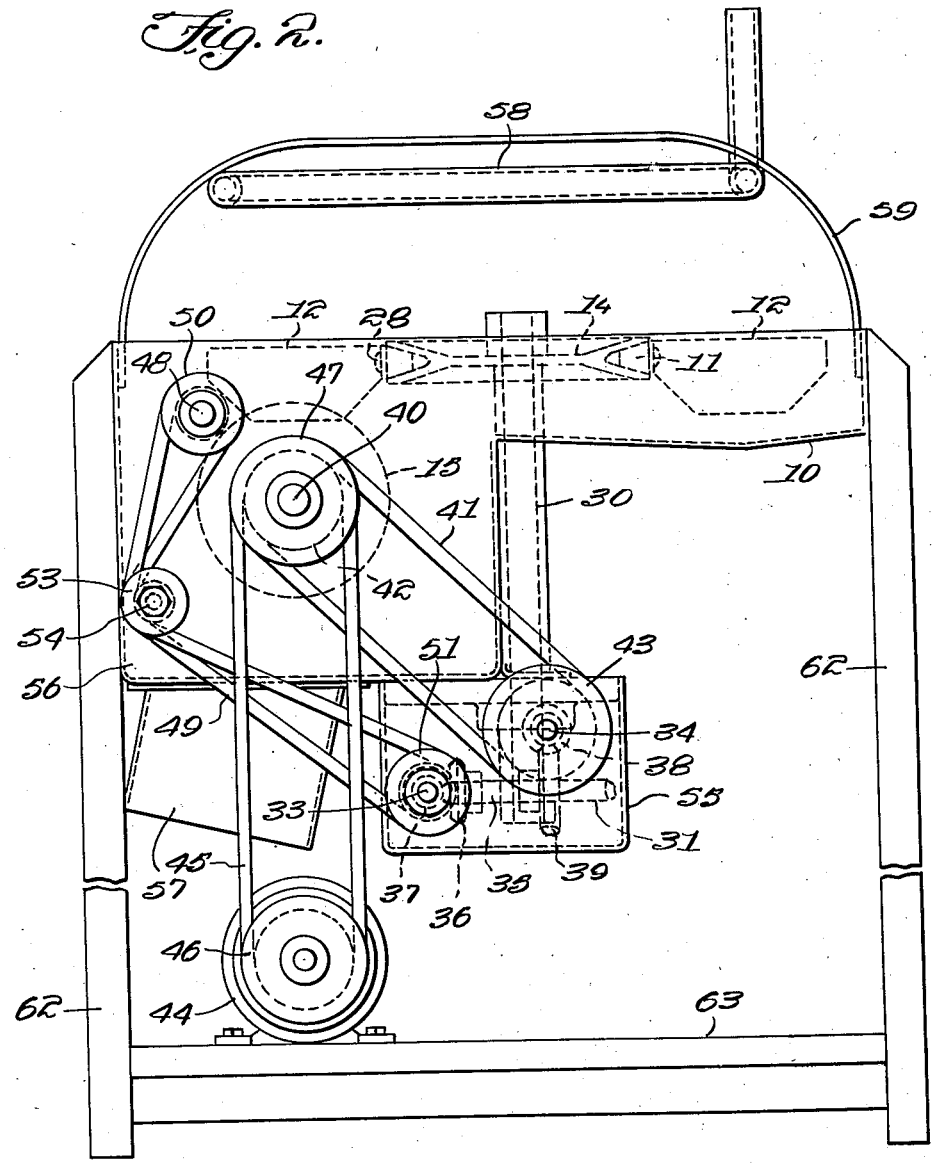
Figure 2 is an end elevation of the machine looking toward the driving end.
Figure 3:
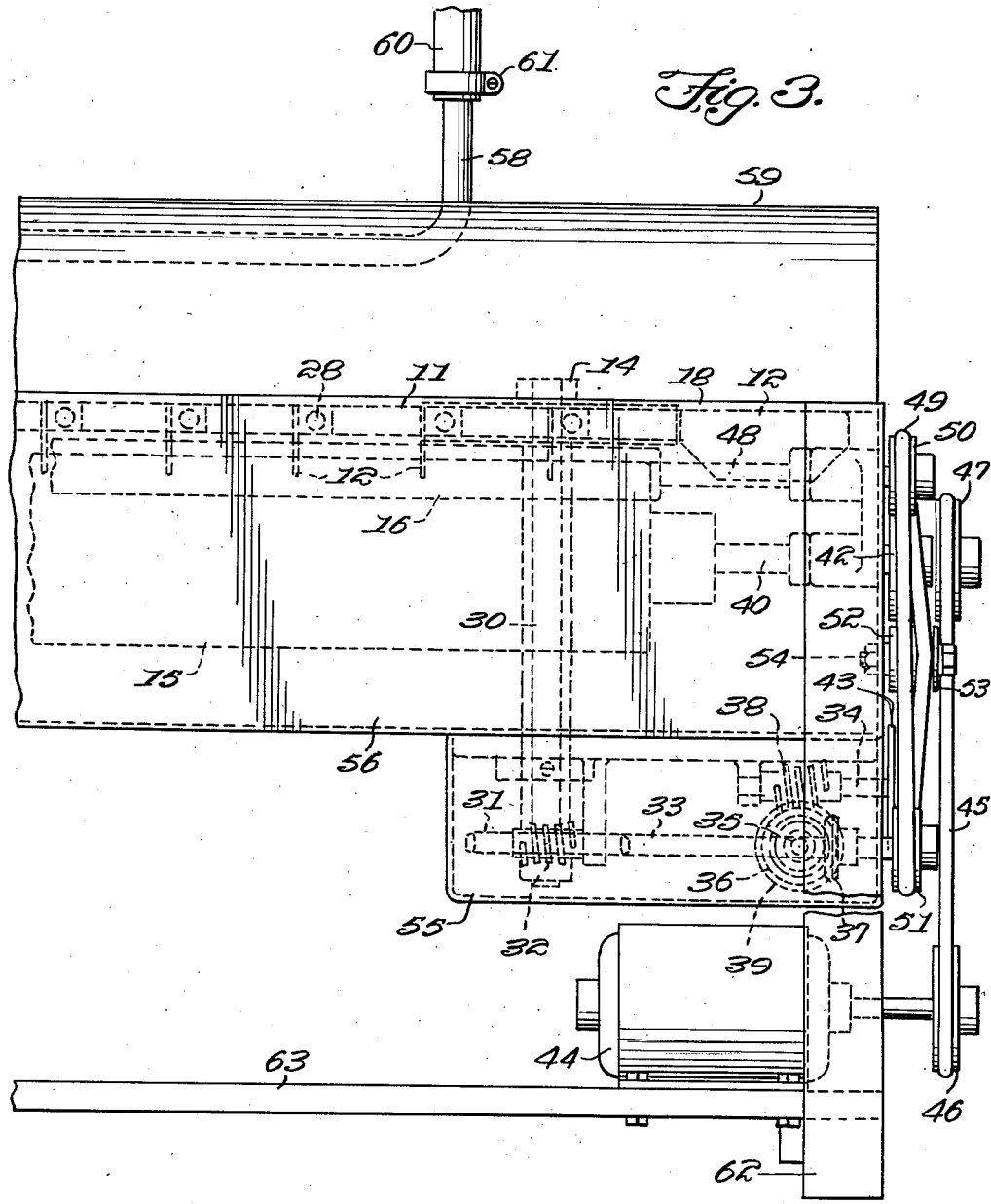
Figure 3 is a side elevational view looking toward the driving end and with the opposite end broken away.

Referring now to the drawings wherein like reference characters denote corresponding parts the egg washing machine of this invention includes a horizontally disposed tray 10 having an endless belt 11 with outwardly extended fingers 12 thereon trained over pulleys 13 and 14, and having a high speed roller 15 and a small roller 16 incorporated in the lower surface of the trough and positioned so that eggs will be rolled thereover by the fingers 12.

Trough 10 is provided with a continuous outer wall having sides 17 and 18 connected by arcuate ends 19 and 20 with the end 19 connected to the side 18 at the point 21 and with the end 20 connected to side 18 at the point 22. The end 20 is provided with a straight or transverse section 23 at the end of the roller 15 and the end 19 is provided with a diagonally disposed straight section 24.

In the operation of the machine eggs are placed in the feeding end of the trough at the point 25 and the fingers 12 carry the eggs around, as illustrated in Figure 1 with the eggs delivered to an area 26 which is positioned to receive the eggs as they are pushed off of the end of the roller 15 by the fingers 12. The fingers 12 are spaced slightly less than the length of the eggs, which causes the eggs to roll both sidewise and endwise, as shown in Figure 1 wherein both the sides and ends of the eggs are clean. The fast rotating roller 15 being formed of fiber and having a soft pliable surface presses the eggs against the smaller roller 16 and with the rollers rotating in the direction of the arrows as shown in Figure 4, the smaller roller will turn the eggs back as indicated by the dot and dash lines and the arrow 27 whereby the entire surfaces of the eggs will be completely clean.

Figure 4:
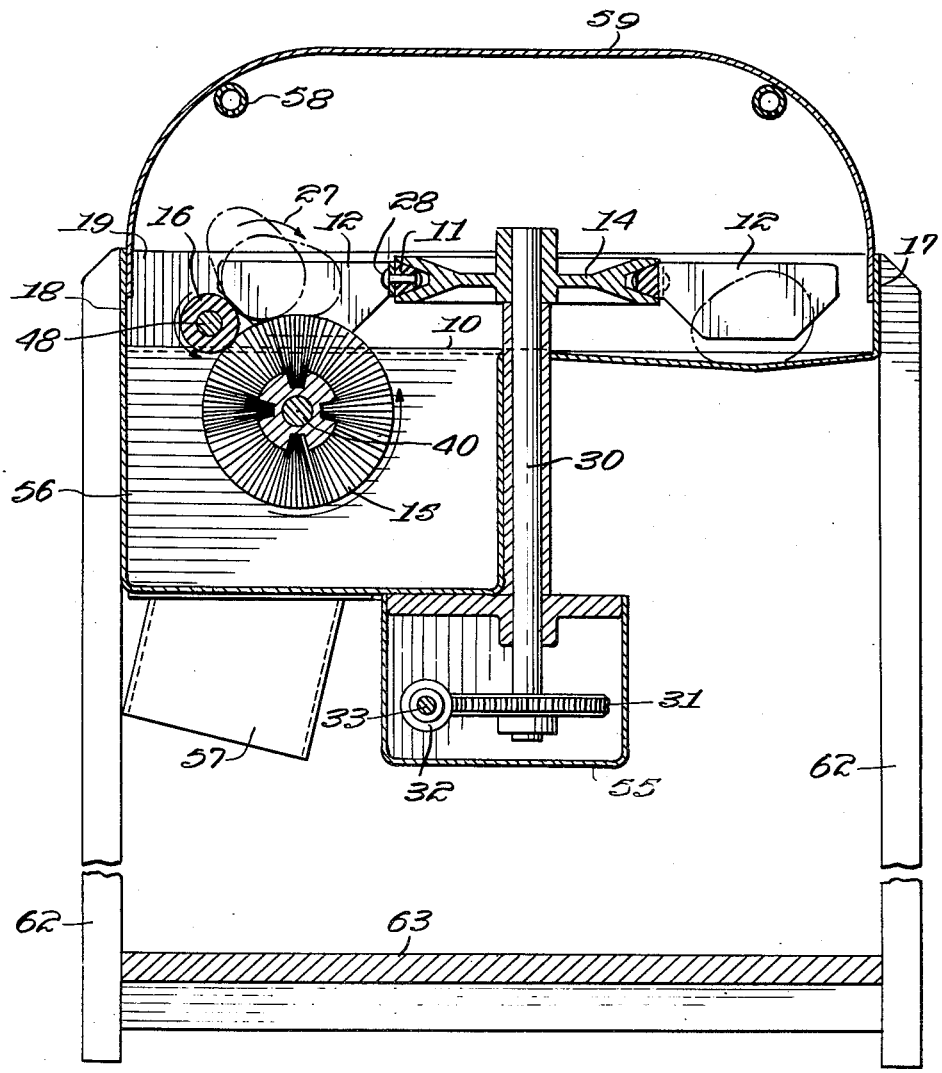
Figure 4 is a typical cross section through the machine looking toward the feeding and delivery end thereof.

The fingers 12 are mounted on the belt 11 by rivets 28, as shown in Figure 4, and the pulleys 13 and 14 over which the belt is trained are fixedly mounted on vertically disposed shafts, the pulley 13 being carried by a shaft 29, and the pulley 14 by a shaft 30. The lower end of the shaft 30 is provided with a gear 31 that meshes with a worm 32 on a shaft 33 and the shaft 33 is rotated from a jack shaft 34 through a stub shaft 35 with the shaft 35 operatively connected to the shaft 33 by beveled gears 36 and 37 and with the shaft 35 rotated by a worm 38 on the shaft 34, which meshes with worm gear 39 on the shaft 35.

The shaft 34 is rotated from the shaft 40 of the roller 15 by a belt 41 trained over pulleys 42 and 43, and the shaft 40 is rotated directly by a motor 44 through a belt 45 that is trained over pulleys 46 and 47.

The shaft 48 of the roller 16 is rotated from the shaft 33 by an endless belt 49 that is trained over pulleys 50 and 51, on the shafts 48 and 33 respectively and over idler pulleys 52 and 53 on a shaft 54.

With the transmission elements arranged in this manner the roller 15 is driven at comparatively high speed directly from the motor whereas the speed of the roller 16 and also of the conveyer 11 is reduced by the worm gears. The gears are enclosed in a housing 55 and the rollers 15 and 16 are mounted in a lower section 56 of the trough 10 into which the water sprayed over the eggs passes and from which the water is removed by spout 57.

Water is sprayed over the eggs by a perforated U-shaped pipe 58 positioned in cover 59 and the pipe 58 extends from the feeding end of the trough around the opposite end and to a point about midway of the length of the roller 15. Water is supplied to the pipe by hose 60 which is connected to the outer end thereof by clamp 61. The trough 10 is mounted in a suitable frame having vertically disposed posts 62, the lower ends of which are connected by a panel 63, and the shafts 40 and 48 of the rollers 15 and 16, respectively journaled in bearings 64 and 65 mounted on the ends 66 and 67 respectively, of the frame.

By this means eggs may be sprayed with warm water as they are rolled through the trough in the direction of the arrow 68 shown in Figure 1 and as they pass around the far end and over a portion of the roller 15. The spray stops about midway of the length of the roller 15 and in passing over the remaining section of the roller the high speed thereof moves the water away from the surface whereby with the eggs rolling over the surface substantially all of the water is removed from the eggs.

It will be understood that modification may be made in the design and arrangement of the parts without departing from the spirit of the invention.

What is claimed is:

1. An egg washing machine comprising an endless horizontally disposed trough having parallel sections positioned in a common horizontal plane and having an opening in the lower surface and in one section thereof, a roller having a soft pliable surface incorporated in the opening of the trough and positioned to receive eggs from the other section of the trough, a small roller positioned above the roller with the soft pliable surface, offset from and parallel to the center thereof, means rotating the rollers with the upper surface of the soft pliable roller traveling toward the smaller roller, means spraying water on the eggs throughout part of the length of the trough, and means rolling eggs through the trough and over the rollers incorporated in the opening therein.

2. An egg washing machine comprising an endless horizontally disposed trough having parallel sections positioned in a common horizontal plane and having an opening in the lower surface and in one section thereof, a roller having a soft pliable surface incorporated in the opening of the trough and positioned to receive eggs from the other section of the trough, a small roller positioned above the roller with the soft pliable surface, offset from and parallel to the center thereof, means rotating the rollers with the upper surface of the soft pliable roller traveling toward the smaller roller, means spraying water on the eggs throughout the length of one section of the trough and to a point midway of the length of the opening in the opposite section thereof, and means rolling eggs through the trough and over the rollers incorporated in the opening therein.

3. An egg washing machine comprising an endless horizontally disposed trough having an opening in the lower surface and in one side thereof, a roller having a soft pliable surface incorporated in the opening in one section of the trough and positioned to receive eggs from the other section of the trough, a small roller positioned above the roller with the soft pliable surface, offset from and parallel to the center thereof, means rotating the rollers with the upper surface of the soft pliable roller traveling toward the smaller roller, means spraying water on the eggs throughout the length of one side of the trough and to a point midway of the length of the opening in the opposite side thereof, a horizontally disposed centrally positioned endless belt trained over pulleys and providing an endless inner wall of the trough, and spaced outwardly extended fingers carried by the belt and positioned to roll eggs throughout the length of the trough.

4. An egg washing machine comprising an endless horizontally disposed trough having an opening in the lower surface and in one side thereof, a roller having a soft pliable surface incorporated in the opening in one section of the trough and positioned to receive eggs from the other section of the trough, a small roller positioned above the roller with the soft pliable surface, offset from and parallel to the center thereof, means rotating the rollers with the upper surface of the soft pliable roller traveling toward the smaller roller, means spraying water on the eggs throughout the length of one side of the trough and to a point midway of the length of the opening in the opposite side thereof, a horizontally disposed centrally positioned endless belt trained over pulleys and providing an endless inner wall of the trough, and spaced outwardly extended fingers carried by the belt and positioned to roll eggs throughout the length of the trough, said fingers and rollers positioned to turn eggs both laterally and longitudinally as the eggs are conveyed over the rollers.

5. In an egg washing machine, the combination which comprises a continuous shallow trough having parallel sections positioned in a common horizontal plane and having a lower water receiving section in one side, a fast rotating longitudinally positioned roller having a soft surface positioned in the water receiving section of the trough and with the upper surface positioned to receive eggs from the trough, a small roller positioned above, offset from and parallel to the former roller, means rotating the rollers with the upper surface of the roller having a soft surface traveling toward the small roller, means spraying water over the trough, and means rolling eggs through the trough and over the rollers.

6. In an egg washing machine, the combination which comprises a continuous shallow trough having parallel sections positioned in a common horizontal plane and having a lower water receiving section in one side, a fast rotating longitudinally positioned roller having a soft surface positioned in the water receiving section of the trough and with the upper surface positioned to receive eggs from the trough, a small roller positioned above, offset from and parallel to the former roller, means rotating the rollers in the same direction and with the upper surface of the roller having a soft surface traveling toward the small roller, means spraying water over the trough, and an endless belt having outwardly extended fingers thereon mounted in the trough and positioned to convey eggs throughout the trough and over the rollers therein.

7. In an egg washing machine, the combination which comprises a continuous shallow trough having parallel sections positioned in a common horizontal plane and having a lower water receiving section in one side, a fast rotating longitudinally positioned roller having a soft surface positioned in the water receiving section of the trough and with the upper surface positioned to receive eggs from the trough, a small roller positioned above, offset from and parallel to the former roller, means rotating the rollers in the same direction and with the upper surface of the roller having a soft surface traveling toward the small roller, means spraying water over the trough, and an endless belt having outwardly extended fingers thereon mounted in the trough and positioned to convey eggs throughout the trough over the rollers therein, a cover enclosing the upper open surface of the trough and a frame for supporting the trough.

8. An egg washing machine comprising an endless horizontally disposed trough having parallel sections positioned in a common horizontal plane and having an opening in the lower surface and in one section thereof, a roller having a soft pliable surface incorporated in the opening of the trough and positioned to receive eggs from the other section of the trough, a small roller positioned above the roller with the soft pliable surface, offset from and parallel to the center thereof, means rotating the rollers with the upper surface of the soft pliable roller traveling toward the smaller roller, said soft pliable roller traveling at high speed whereby water is thrown from the eggs to facilitate drying, means spraying water on the eggs throughout part of the length of the trough, and means rolling eggs through the trough and over the rollers incorporated in the opening therein.

9. An egg washing machine comprising an endless horizontally disposed trough having an opening in the lower surface and in one side thereof, a roller having a soft pliable surface incorporated in the opening in one section of the trough and positioned to receive eggs from the other section of the trough, a small roller positioned above the roller with the soft pliable surface, offset from and parallel to the center thereof, means rotating the rollers with the upper surface of the soft pliable roller traveling toward the smaller roller, means spraying water on the eggs throughout the length of one side of the trough and to a point midway of the length of the opening in the opposite side thereof, a horizontally disposed centrally positioned endless belt trained over pulleys and providing an endless inner wall of the trough, and spaced outwardly extended fingers carried by the belt and positioned to roll eggs throughout the length of the trough, said fingers spaced a distance less than the length of an egg whereby the eggs are turned endwise as they travel over the roller.

OTTO ZAUNER.

References Cited in the file of this patent

UNITED STATES PATENTS

| Number | Name | Date |
| --- | --- | --- |
| 589,141 | Rice | Aug. 31, 1897 |
| 1,513,195 | Stevens | Oct. 28, 1924 |
| 1,530,415 | Roussel | Mar. 17, 1925 |
| 1,955,749 | Jones | Apr. 24, 1934 |
| 2,012,655 | Bowman | Aug. 27, 1935 |
| 2,548,798 | Irons | Apr. 10, 1951 |

FOREIGN PATENTS

| Number | Country | Date |
| --- | --- | --- |
| 26,721 | Great Britain | of 1909 |
| 408,699 | Great Britain | Apr. 19, 1934 |